N. C. GARLAND.
HOOK.
APPLICATION FILED SEPT. 23, 1910.
1,017,530.
Patented Feb. 13, 1912.
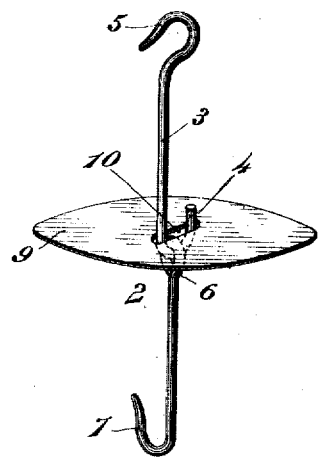
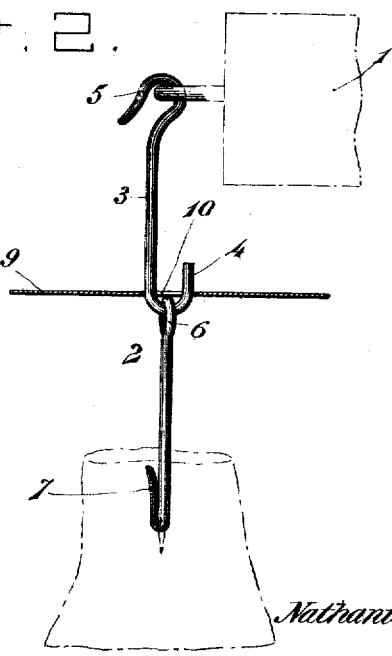
Witnesses
Inventor
Nathaniel C. Garland
By Victor J. Evans
Attorney

UNITED STATES PATENT OFFICE.

NATHANIEL C. GARLAND, OF CHASE CITY, VIRGINIA.

HOOK.

1,017,530.

Specification of Letters Patent.   Patented Feb. 13, 1912.

Application filed September 23, 1910. Serial No. 583,460.

*To all whom it may concern:*

Be it known that I, NATHANIEL C. GARLAND, a citizen of the United States, residing at Chase City, in the county of Mecklenburg and State of Virginia, have invented new and useful Improvements in Hooks, of which the following is a specification.

This invention relates to improvements in hooks, and the primary object of the invention is to provide a hook of a simple and inexpensive construction, designed particularly for hanging harness, and hams and other meats on racks or departments, which is so constructed as to prevent rodents from crawling from the rack upon which the harness or meat is hung into proximity with the harness or meat and from devouring and injuring the same.

With the above, and other objects in view, which will appear as the description progresses, the invention resides in the novel construction and combination of parts hereinafter fully described and claimed.

In the accompanying drawings, Figure 1 is a perspective view of the device constructed in accordance with the present invention. Fig. 2 is an elevation of the device showing the protector disk in section.

In the accompanying drawings the numeral 1 designates a rack or other suitable support, and 2 the harness or meat hook adapted to be suspended from the support. In the present instance the harness or meat hook 2 is constructed of a pair of sections or members. One of these members, designated by the numeral 3 has both of its ends bent in opposite directions to provide hooks 4 and 5. The upper hook 5 is adapted to engage with the sustaining rack or member 1, while the lower hook is adapted to engage with an eye 6 formed upon the lower section 2. The opposite end of the lower section is provided with a hook 7 upon which the harness or ham or other small meat is suspended.

It is well known that places from which harness and meats are held suspended are infested with rodents, and these animals obtain access to the harness or meat by crawling upon the bench or support and down the hook sustaining the harness or meat where they can devour the harness or meat at their leisure. In order to overcome this I have provided the members comprising the sustaining hook with what I term a protective disk 9. This disk 9 is centrally provided with a longitudinal slot 10, the latter being of a size equaling the distance between the outer end of the hook and the body of the upper section 3, and the outer face of the said disk is contacted by the eye 6, so that the disk is effectively and securely sustained upon the members of the holding device at their point of connection, but at the same time the said disk is free to tilt in either direction so that a rodent alighting upon the disk from the upper section of the hook or sustaining device will be thrown therefrom to the floor and away from contact with the harness or meat suspended by the hook.

From the above description, taken in connection with the accompanying drawings, it will be noted that I have provided an extremely simple and effective device for the purpose intended, and while I have illustrated and described the preferred embodiment of the improvement, as it now appears to me, minor details of construction, within the scope of the following claim, may be resorted to if desired.

Having thus fully described the invention, what I claim as new is:—

In a device for the purpose set forth a pair of hook members, one of said hook members being provided with an eye, the second member having one of its ends up-set to engage with the eye, a disk having a centrally arranged elongated slot normally resting upon the eye of the first named hook member and having the up-set portion of the second named hook member pass through the elongated slot substantially as and for the purpose set forth.

In testimony whereof I affix my signature in presence of two witnesses.

NATHANIEL C. GARLAND.

Witnesses:
T. E. SMITH, Jr.,
J. R. ....ETTE.